(12) United States Patent
Hartl et al.

(10) Patent No.: US 9,601,148 B2
(45) Date of Patent: *Mar. 21, 2017

(54) ROBOTIC SAFETY STOP FOR AUTOMATED STORAGE LIBRARY

(71) Applicant: INTERNATIONAL BUSINESS MACHINES CORPORATION, Armonk, NY (US)

(72) Inventors: Nicholas A. Hartl, San Jose, CA (US); Shawn M. Nave, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/551,734

(22) Filed: Nov. 24, 2014

(65) Prior Publication Data

US 2015/0076834 A1   Mar. 19, 2015

Related U.S. Application Data

(63) Continuation of application No. 13/458,811, filed on Apr. 27, 2012, now Pat. No. 8,898,881, which is a continuation of application No. 12/687,333, filed on Jan. 14, 2010, now Pat. No. 8,585,103.

(51) Int. Cl.
| | | |
|---|---|---|
| *G11B 15/68* | (2006.01) | |
| *G11B 17/22* | (2006.01) | |
| *E05C 19/06* | (2006.01) | |

(52) U.S. Cl.
CPC ............. *G11B 15/68* (2013.01); *E05C 19/06* (2013.01); *G11B 15/6835* (2013.01); *G11B 17/22* (2013.01); *G11B 17/225* (2013.01); *Y10S 901/49* (2013.01); *Y10T 16/625* (2015.01); *Y10T 29/49826* (2015.01); *Y10T 29/49874* (2015.01); *Y10T 292/0894* (2015.04); *Y10T 292/096* (2015.04); *Y10T 292/0969* (2015.04); *Y10T 292/0976* (2015.04)

(58) Field of Classification Search
CPC ..... G11B 15/68; G11B 15/6835; G11B 17/22; G11B 17/225; E05C 19/06; Y10T 29/49826; Y10T 292/0969; Y10T 292/0894; Y10T 292/0976; Y10T 292/096; Y10T 29/49874; Y10T 16/625; Y10S 901/49

See application file for complete search history.

(56) References Cited

U.S. PATENT DOCUMENTS

| | | |
|---|---|---|
| 3,614,145 A | 10/1971 | Zawadzki et al. |
| 3,737,184 A | 6/1973 | Swartz |
| 3,767,238 A | 10/1973 | Zawadzki |

(Continued)

FOREIGN PATENT DOCUMENTS

JP    2000156017    6/2000

*Primary Examiner* — John C Hong
(74) *Attorney, Agent, or Firm* — Griffiths & Seaton PLLC

(57) ABSTRACT

A safety stop mechanism for an automated storage library in which a connector has first and second ends. The first end is configured to contact a door of the automated storage library when the door is in at least a first position. A safety stop is connected to the second end of the connector and adapted to move from a down position to an up position. The safety stop is in the down position when the door is in the first position allowing for travel of the robotic accessor over the safety stop.

21 Claims, 8 Drawing Sheets

(56) References Cited

U.S. PATENT DOCUMENTS

| | | | |
|---|---|---|---|
| 4,167,280 A | 9/1979 | Godec et al. | |
| 4,545,606 A | 10/1985 | Vodra | |
| 4,597,599 A | 7/1986 | Bisbing | |
| 4,777,810 A | 10/1988 | Webster | |
| 5,085,475 A | 2/1992 | Austin et al. | |
| 5,430,588 A | 7/1995 | Rasmussen | |
| 5,490,696 A | 2/1996 | Hutson | |
| 5,775,748 A | 7/1998 | Kurachi | |
| 6,588,809 B1 | 7/2003 | Derman | |
| 6,808,226 B2 | 10/2004 | Hirano | |
| 6,834,215 B1 | 12/2004 | Ostwald | |
| 6,854,773 B2 | 2/2005 | Lin | |
| 7,230,199 B2 | 6/2007 | Chou et al. | |
| 7,255,525 B2 | 8/2007 | Smith et al. | |
| 7,273,344 B2 | 9/2007 | Ostwald et al. | |
| 7,450,330 B2 | 11/2008 | Sasaki | |
| 7,520,152 B2 | 4/2009 | Sabo | |
| 7,878,558 B1 | 2/2011 | Bell | |
| 8,585,103 B2 * | 11/2013 | Hartl | G11B 15/68 292/80 |
| 8,898,881 B2 * | 12/2014 | Hartl | G11B 15/68 29/452 |
| 2004/0227351 A1 | 11/2004 | Lin | |
| 2008/0067818 A1 | 3/2008 | Dinh et al. | |
| 2009/0058102 A1 | 3/2009 | Garneau et al. | |

* cited by examiner

ROBOTIC SAFETY STOP FOR AUTOMATED STORAGE LIBRARY

CROSS REFERENCE TO RELATED APPLICATIONS

This Application is a Continuation of U.S. patent application Ser. No. 13/458,811, filed on Apr. 27, 2012, which is a Continuation of U.S. patent application Ser. No. 12/687,333, filed on Jan. 14, 2010.

BACKGROUND OF THE INVENTION

Field of the Invention

The present invention relates in general to computers, and more particularly to apparatus and method embodiments directed to an automatically activated robotic safety stop for automated storage libraries in a computing storage environment.

Description of the Related Art

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that More data to, and/or retrieve data from, the data storage media. The transport of data storage media between data storage shelves and data storage drives is typically accomplished by one or more robotic accessors (hereinafter termed "accessors"). Such accessors have grippers for physically retrieving the selected data storage media from the storage shelves within the automated data storage library and transport such media to the data storage drives by moving in the horizontal "X" and vertical "Y" directions.

SUMMARY OF THE INVENTION

In many automated tape libraries today, multiple robotic accessors are used to provide customers high availability library systems with redundant robotic mechanisms. A common technique for these high availability library systems is to have two robotic accessors operate on the same rail system. When a failure occurs on one of the robotic accessors, it may be moved into a service area of the library while the other robotic accessor continues to perform operations on the active portion of the library. In order to service the failed accessor, a safety barrier or "stop" must be provided to keep the active accessor from entering the service area of the library while the service personnel is in this space. The safety barrier or stop must be operational in the worst case event where the second active robotic accessor were to run out of control trying to enter the area where the service personnel are servicing the failed robotic accessor. Typically this safety barrier or stop is a door that is slid into place or assembled into place by the service personnel upon opening the door to the automated tape library and entering the robotic accessor space.

One drawback of the above solution is that if the safety barrier or stop is not installed correctly by the service personnel, the library will either not resume work with the one non-failed accessor or, the library will resume its operation and create a possible safety exposure for the active accessor being able to crash through the incorrectly installed safety barrier or stop. Another drawback of this solution is that there is some time required by the service personnel to activate or install the safety barrier or stop. This is not desirable in today's world where service calls are needed to be as short as possible to keep warranty and service costs to a minimum. Accordingly, a need exists for a safety stop mechanism that minimizes or eliminates the drawbacks previously described.

In view of the foregoing, method embodiments directed to a safety stop mechanism for a robotic accessor in an automated storage library are provided. In one such embodiment, by way of example only, a connector has first and second ends. The first end is configured to contact a door of the automated storage library when the door is in at least a first position. A safety stop is connected to the second end of the connector and adapted to move from a down position to an up position. The safety stop is in the down position when the door is in the first position to allow for travel of the robotic accessor over the safety stop.

In addition to the foregoing exemplary embodiment, various additional apparatus and method embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
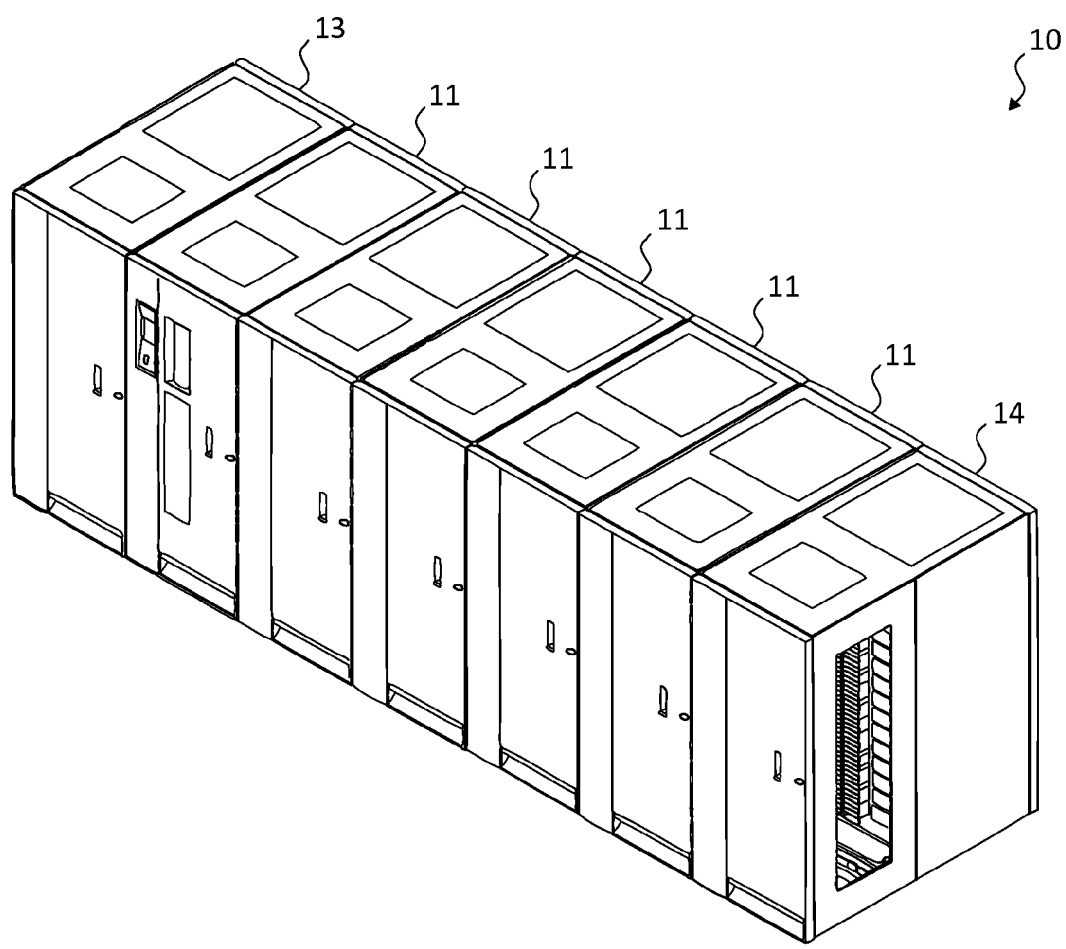
FIG. 1 illustrates an isometric view of an automated data storage library adaptable to implement an embodiment of the present invention, with the view specifically depicting a library having a left hand service bay, multiple storage frames and a right hand service bay.
Figure 2:
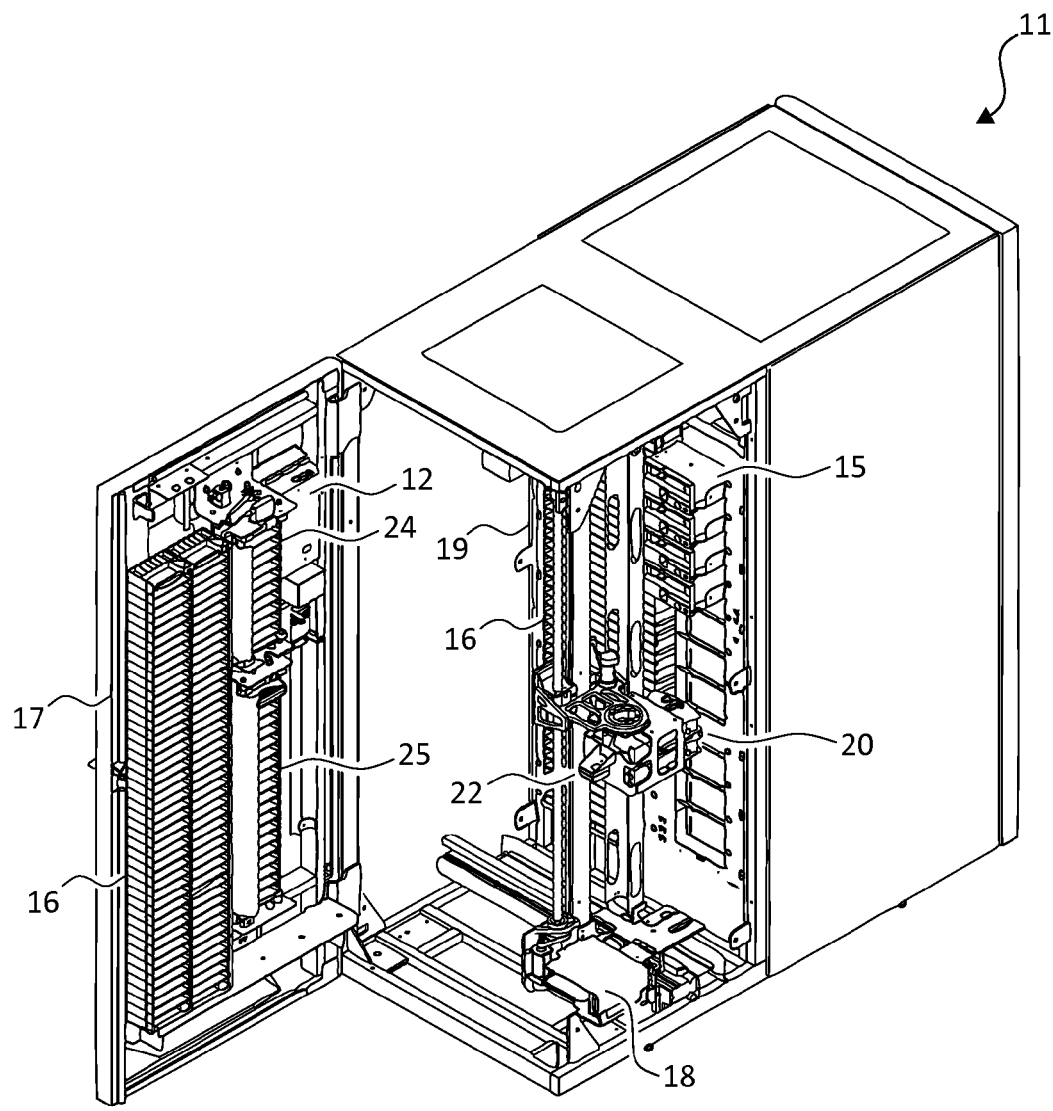
FIG. 2 illustrates an isometric view of an automated data storage library adaptable to implement various aspects of the present invention and claimed subject matter, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library that may implement the present invention, and has a configuration as depicted in FIGS. 1 and 2, is the IBM® 3584 UltraScalable Tape Library.

The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2, following, shows an example of a storage frame 11, which is the base frame of the library 10 and is contemplated to be the minimum configuration of the library. In this minimum configuration, there is only a single accessor (i.e., there are no redundant accessors) and there is no service bay. While the depicted embodiment shows a single accessor, one of ordinary skill in the art will appreciate that in many configurations, an additional (redundant) assessor is provided with the first accessor along a single rail system. Various aspects of the present invention will be applicable to the minimum configuration, the redundant configuration just described, and other configurations as one of ordinary skill in the art will appreciate.

The library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15 (here again, a redundant, second accessor may also be similarly configured). The data storage drives 15 may be optical disk drives or magnetic tape drives, or other types of data storage drives as are used to read and/or write data with respect to the data storage media. The storage frame 11 may optionally comprise an operator panel 12 or other user interface, such as a web-based interface, which allows a user to interact with the library. The storage frame 11 may optionally comprise an upper I/O station 24 and/or a lower station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper assembly 20, to "read" identifying information about the data storage media.

Referring still to FIG. 2, a robotic safety stop mechanism 30 is depicted mounted to a base structure of the frame 11 as will be further described. The depicted embodiment of the safety stop mechanism 30, along with other representative exemplary embodiments, provide for automatic activation when service personnel opens the door to the frame 11, again as will be further described. This automatic activation of the safety stop prevents the service personnel from being able to incorrectly install the safety barrier or stop, as well as prevents the personnel from forgetting to install the safety barrier or stop. A lack of installation, in some implementations for example, may cause significant down time for the library 10. Finally, the illustrated embodiments allow for rapid activation of the safety stop to maintain a minimal amount of required service time.

In one exemplary embodiment, the safety stop mechanism 30 operates by use of a spring-loaded plunger connected to a moveable safety stop for the robotic accessor. The safety stop and its associated mechanism are located at the bottom of the automated tape library frame. During normal library operation, the safety stop is in a down position, which allows the robotic accessors to pass over the safety stop without any interference. This down position is maintained by having the spring-loaded plunger in contact with the closed library end door. When the end door is opened, the spring-loaded plunger activates the safety stop moving it to the up position, as will be further described.

When a failure occurs on one of the robotic accessors in one exemplary configuration, the robotic accessor is moved into the service area of the library either by moving itself or being pushed by the other non-failed, or active, robotic accessor. The failed accessor remains in this location until the service personnel arrives at the library to service the failed robotic accessor. When the service personnel opens the door to service the accessor, the spring-loaded plunger is able to extend toward the opening created by opening the end door of the library. This motion and the coupling to the safety stop, allows the safety stop to be lifted into its activated position such that the active accessor cannot crash through the safety stop entering the area where the service action is taking place. A sensor may be placed on the mechanism to sense that the safety stop is fully activated.

The active accessor will not be able to move and the library will be down until this sensor on the mechanism is triggered.

After completing the service action, the service personnel closes the end door of the library and the spring-loaded plunger again is pushed in to the library, returning the safety stop to its inactive down position allowing both robotic accessors to pass over the top of the stop for normal library operation. The design of the illustrated embodiments allows for an integrated safety stop to be installed on either end of the library string, such that two of these mechanisms are installed, one on each side of the library, so that if a failure occurs on either of the two robotic accessors, a safety stop mechanism is in place to perform the required service action.

One of ordinary skill in the art will appreciate that other similar embodiments may be contemplated where, commensurate with a degree of movement of a door of the library frame, a corresponding movement is induced in a safety stop device such that the device engages from an inactive state to an active state. For this reason, while many of the illustrated embodiments in the instant description make reference to an aforementioned spring-loaded plunger, some of the following claimed subject matter refers to a "connector" adapted to make contact with the door of the library frame.

Figure 3:
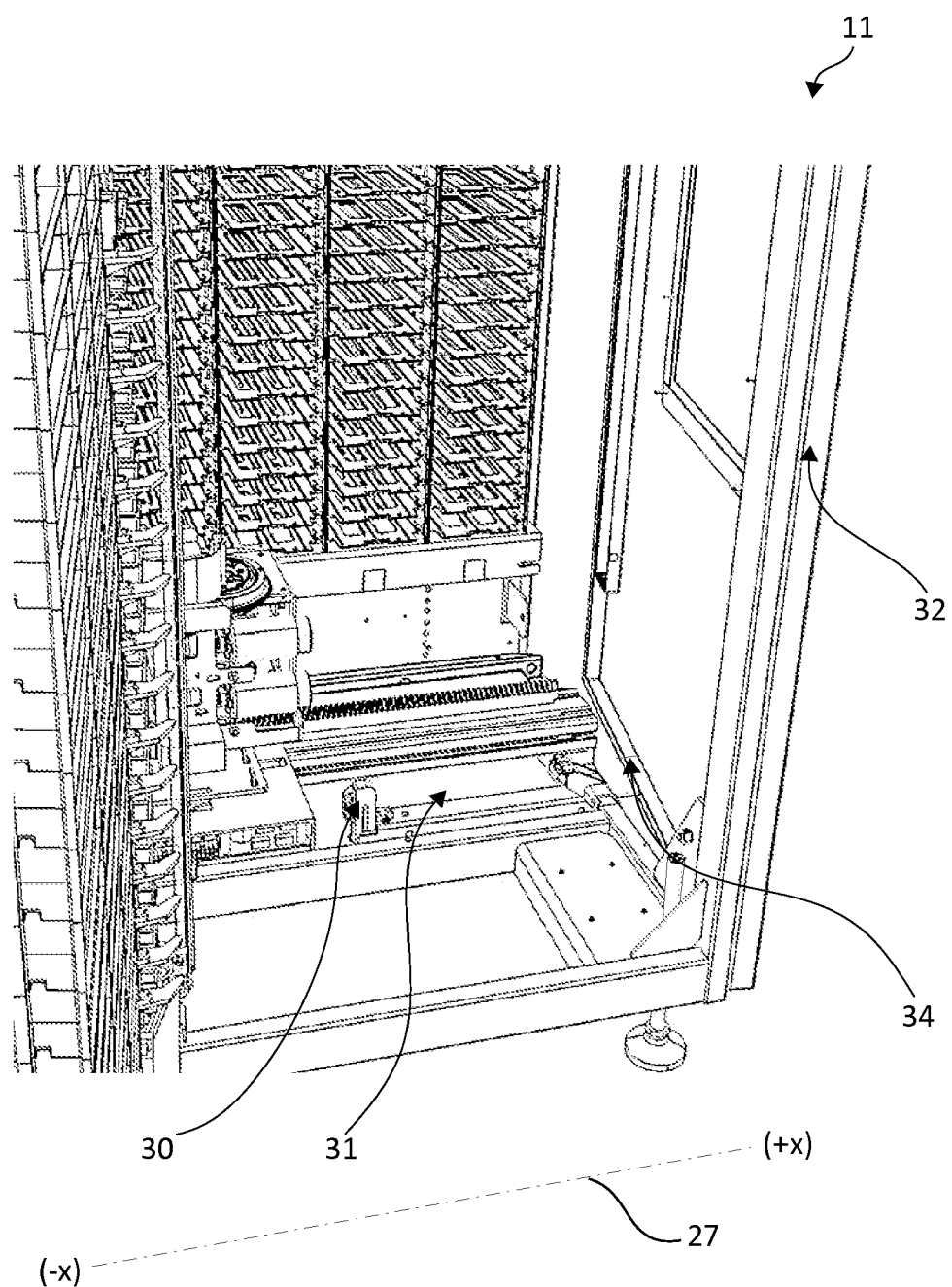
FIG. 3 illustrates an additional isometric view of a portion of the automated data storage library shown in FIG. 2, including a robotic safety stop embodiment of the present invention in a side view.

FIG. 3, following, shows an isometric, side view of a portion of the library frame 11 depicted earlier in FIGS. 1 and 2. In the depicted representation, the end door 32 of the library is ajar, allowing the spring-loaded plunger 34 to travel horizontally in substantially the +x direction (represented rightward along arrow 27), and activating the safety stop 30 of the safety stop mechanism 31 in an up position as will be further described.

Figure 4:
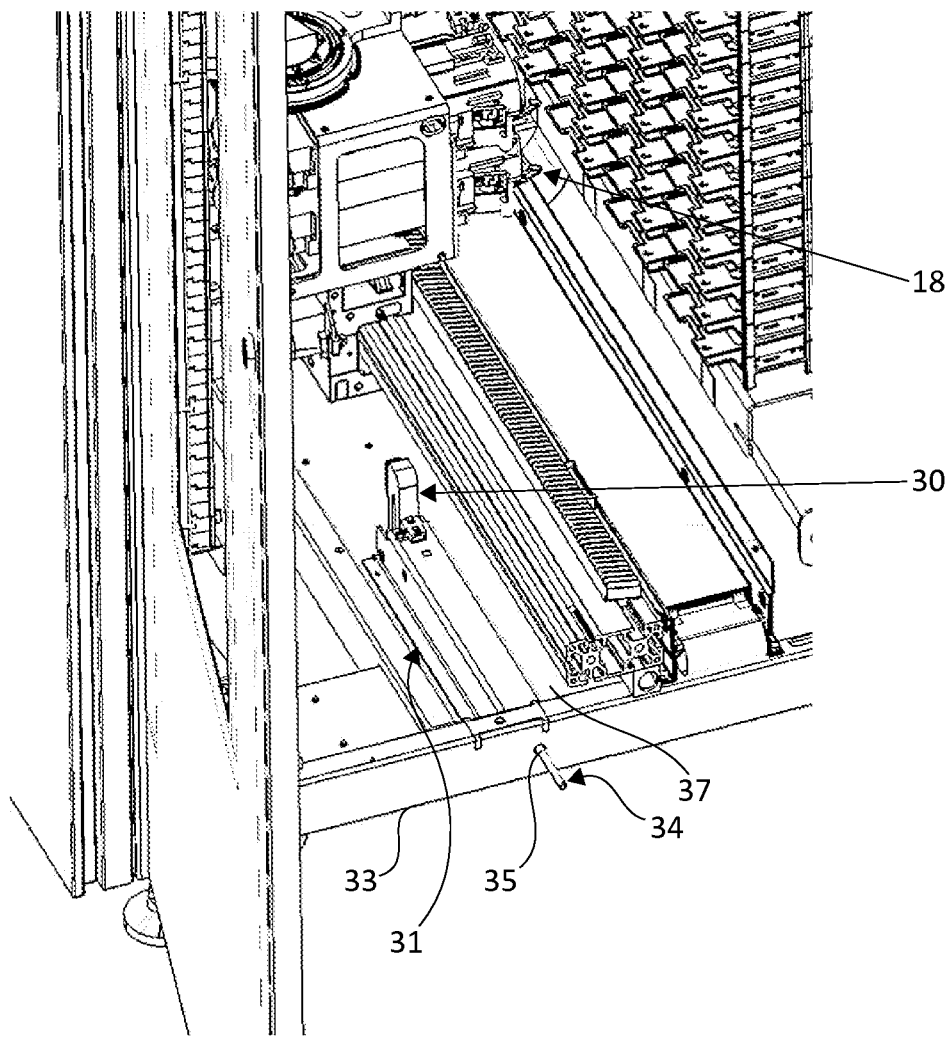
FIG. 4 illustrates an additional isometric view of an additional portion of the automated data storage library shown in FIG. 2, including an additional robotic safety stop embodiment of the present invention in a front view.

FIG. 4 shows an isometric, front view of an additional portion of the library frame 11. Here, the safety stop mechanism 31 is seen in a front view. The spring-loaded plunger 34 emerges from an opening 35 placed in a sidewall 33 of the frame 11. The safety stop mechanism 31 is securely mounted to a base structure 37 of the frame 11. In the depicted representation, the robotic accessor 18 is shown in the background. When the safety stop 30 is in an up position as shown, movement of the robotic accessor 18 is prohibited beyond (forward in the instant representation) the safety stop 30 as one of ordinary skill in the art will appreciate.

Figure 5:
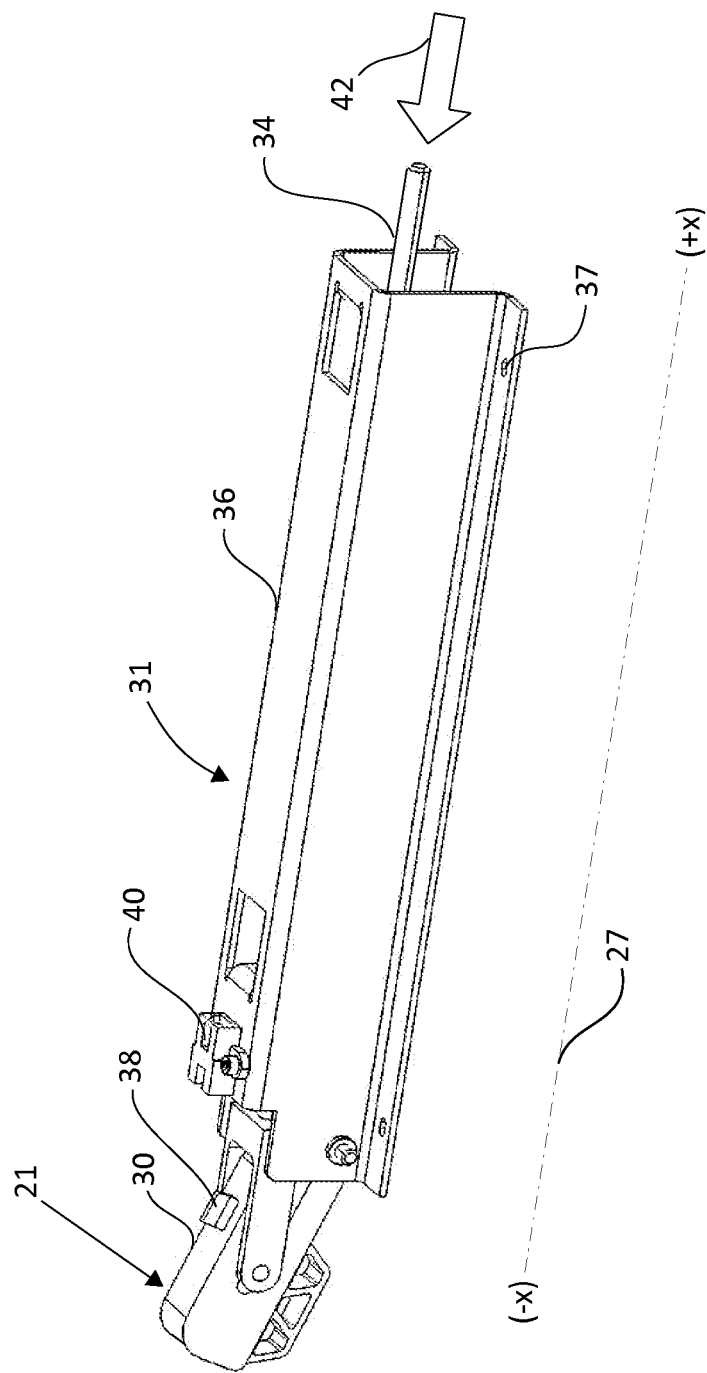
FIG. 5 illustrates an isometric view of an exemplary embodiment of a robotic safety stop mechanism in a side view, depicting an integrated safety stop in a down position.

Turning now to FIG. 5, an isometric view of the safety stop mechanism is shown, where the safety stop is in a down position. In the depicted embodiment, the safety stop mechanism 31 includes a spring-loaded plunger 34 configured to contact an end door of the library. Arrow 42 represents compressive force applied by the door to the spring-loaded plunger 34, causing the plunger 34 to travel laterally in the −x direction (represented leftward along arrow 27). Pressure on the plunger 34 causes the safety stop 30 to move from an up position to the down position shown by arrow 21.

A housing 36 encloses the spring-loaded plunger 34 and spring mechanism as will be further described. In the depicted embodiment, openings 37 may be adapted to receive a mounting screw to attach the housing 36 to a base structure of the frame as previously described. A sensor device 40 and flag 38 may be connected to a portion of the housing 36 and the safety stop 30 as shown for detecting when the safety stop 30 is in an up position and/or down.

Figure 6:
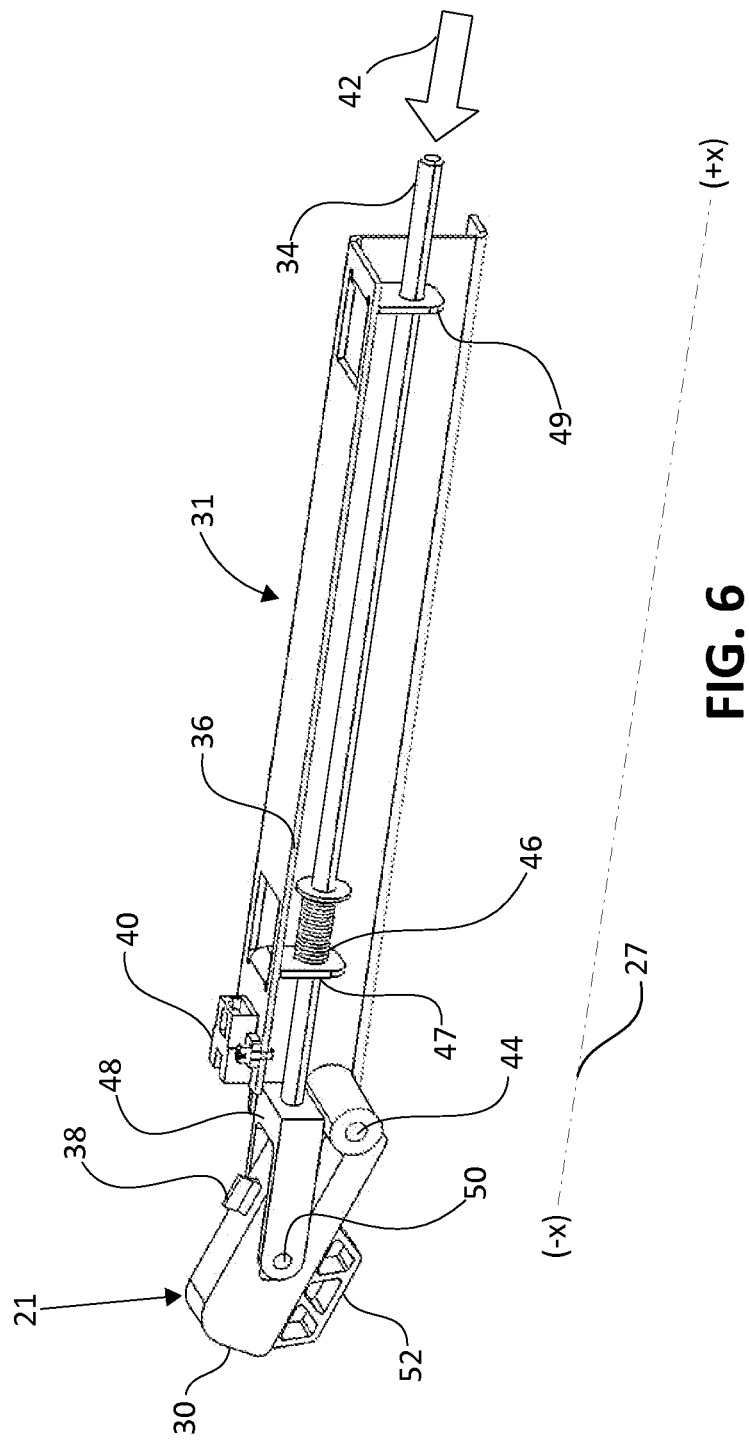
FIG. 6 illustrates a partial section view of the robotic safety stop mechanism embodiment depicted in FIG. 5.

FIG. 6, following, depicts a partial section view of the safety stop mechanism 31 with the safety stop 30 in a down position (indicated by arrow 21). A rubber bumper 52 is connected to safety stop 30 as shown to cushion engagement of the stop 30 with the robotic accessor. In the instant depiction, a portion of the housing 36 is cut away, allowing for view of the spring-loaded plunger 34. Two stamp out portions of the housing 36, surfaces 47 and 49 are shown. Surface 47 provides a backstop for the spring mechanism 46 to rest, while surface 49 acts as a guide to provide alignment of the plunger 34.

As is more clearly shown in the partial section view, a u-shaped bracket structure 48 is attached to an end of the plunger 34. The bracket 48 is adapted to slide along a portion of the safety stop 30 as the safety stop 30 pivots about pin 44. Compressive pressure (again denoted by arrow 42) on the plunger 34 exerted by a side door of the frame causes the plunger 34 to travel laterally substantially in the −x direction (again represented leftward along arrow 27), also directing lateral force along the bracket 48 and to attachment pin 50, transferring such forces to the safety stop 30. As one of ordinary skill in the art will appreciate, the compressive pressure is transferred to the stop 30, causing the stop to move from an up position to a down position as indicated, while also compressing the spring 46.

Figure 7:
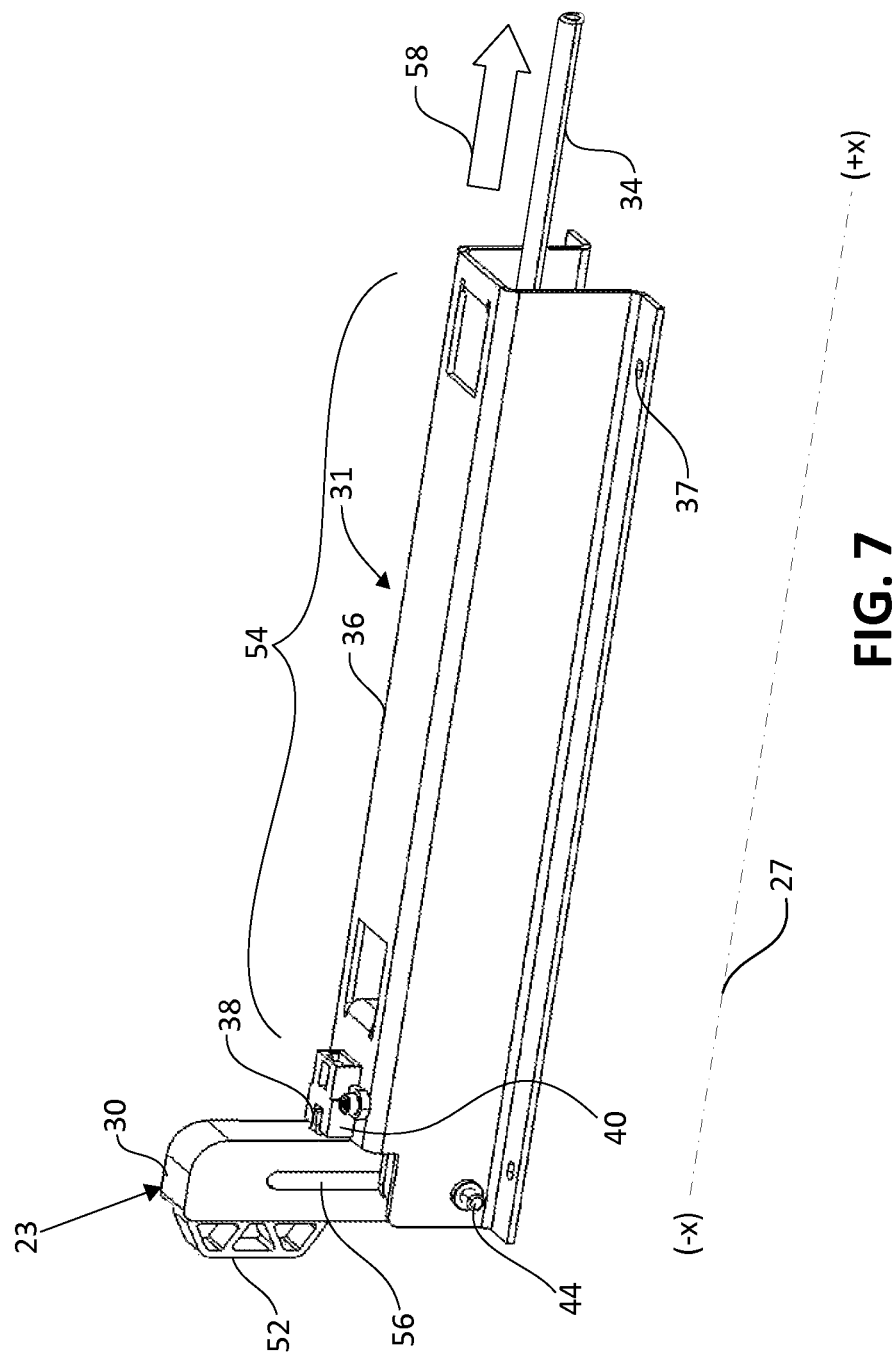
FIG. 7 illustrates the robotic safety stop mechanism embodiment depicted in FIG. 5 with the integrated safety stop in an up position.

FIG. 7 depicts the safety stop mechanism 31 with the safety stop 30 in an up position (denoted by arrow 21). As is more clearly shown, a cam track 56 embedded in the safety stop 30 allows for the pin 50 (FIG. 6) to move, such that when a lateral force in the +x direction (caused by expansion of the spring mechanism 46, FIG. 6, and again represented rightward along arrow 27) is exerted on the pin 50 by the plunger 34 (denoted by arrow 58), the safety stop 30 is pulled from a down position to the up position as shown. Again, sensor 40 and flag 38 are shown such that the sensor 40 is blocked by the flag 38, indicating to the automated control system that the safety stop is activated. Housing 36 is substantially wide enough (as indicated by width 54) to accommodate a width of a failed robotic accessor.

Figure 8:
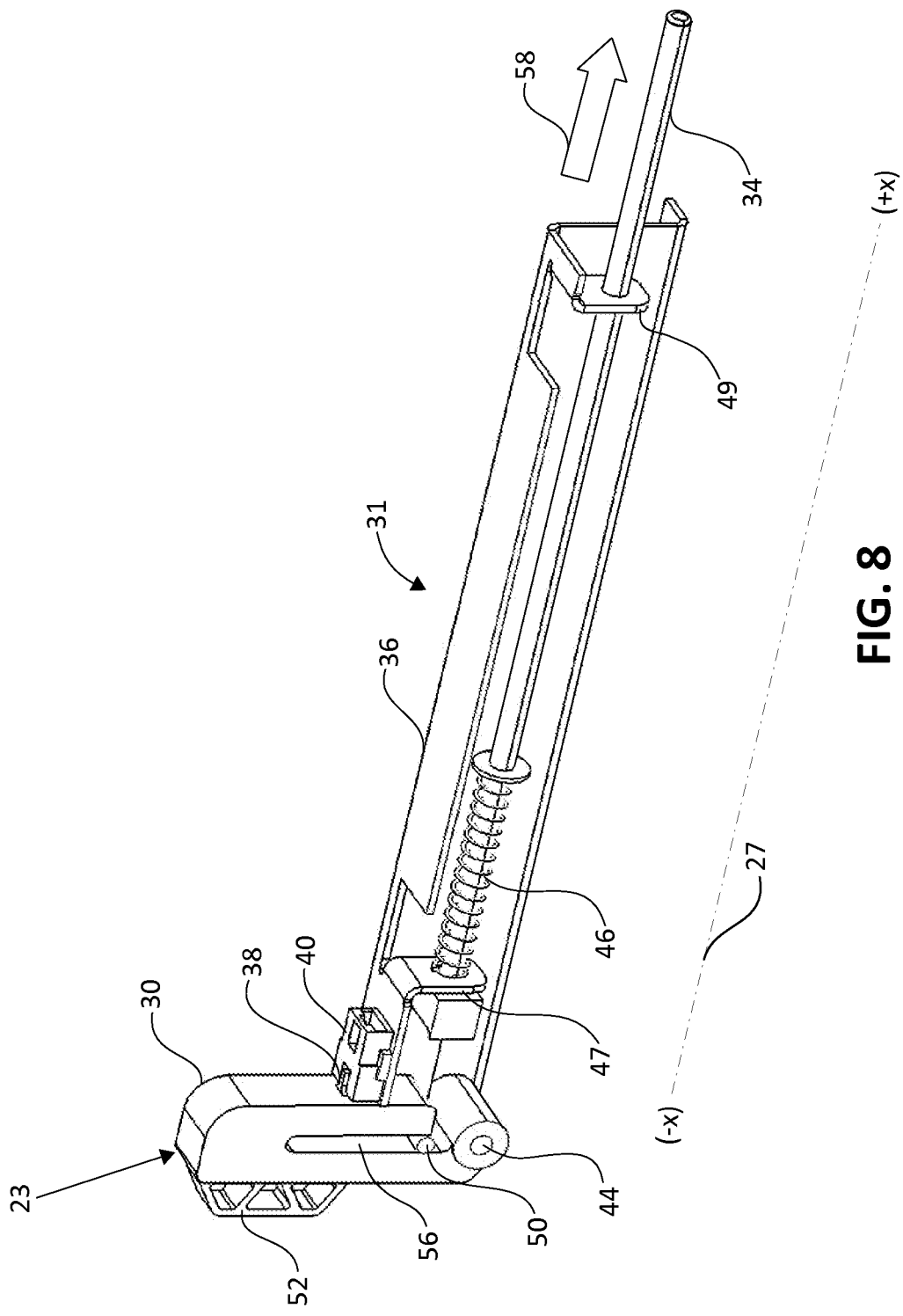
FIG. 8 illustrates an additional partial section view of the robotic safety stop mechanism embodiment depicted in FIG. 5 with the integrated safety stop in an up position.

FIG. 8, following, depicts an additional partial section view of the safety stop mechanism 31, where the safety stop 30 is in an up position (again as denoted by arrow 21). A more detailed view of the cam track 56 is shown, along with the pin 50 and pin 44 allowing the safety stop 30 to pivot. As is shown, the spring mechanism 46 is released by expansion of the plunger 34 in the lateral +x direction (again denoted by arrow 58, and again represented by rightward travel along the arrow 27).

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A safety stop mechanism for a robotic accessor in an automated storage library, comprising:
   a connector having first and second ends, the first end configured to contact a door of the automated storage library when the door is in at least a first position; and
   a safety stop connected to the second end of the connector and adapted to move from a down position to an up position, the safety stop in the down position when the door is in the first position to allow for travel of the robotic accessor over the safety stop.

2. The safety stop mechanism of claim 1, wherein the connector is adapted to travel laterally corresponding to movement of the door between the first position and a second position, consequently moving the safety stop from the down position to the up position, the up position preventing travel of the robotic accessor beyond the safety stop.

3. The safety stop mechanism of claim 2, wherein the first position of the door is closed and the second position of the door is open.

4. The safety stop mechanism of claim 1, further including a bracket, pinned through the safety stop, to connect the safety stop to the second end of the connector.

5. The safety stop mechanism of claim 4, further including a cam track integrated into the safety stop, at least a portion of the pinned bracket traveling along the cam track as the safety stop is moved from the down position to the up position.

6. The safety stop mechanism of claim 1, wherein the connector is a spring-loaded plunger.

7. The safety stop mechanism of claim 1, wherein the connector is at least partially enclosed by a housing.

8. The safety stop mechanism of claim 7, further including a pin connecting at least a portion of the safety stop to the housing, wherein the safety stop is adapted for pivoting from the down position to the up position about the pin.

9. The safety stop mechanism of claim 7, further including a sensor device connected to the housing, wherein the sensor device is adapted for detecting the safety stop in at least one of the up position and the down position.

10. The safety stop mechanism of claim 7, wherein the housing is adapted for mounting to a base structure of the automated storage library.

11. A safety stop mechanism for a robotic accessor in an automated storage library, comprising:
   a housing;
   a plunger, spring-loaded to a portion of the housing, and having a first end adapted to contact a door of the automated storage library when the door is in at least a first position; and
   a safety stop connected to an end of the plunger and adapted to move from a down position to an up position, the safety stop being in the down position when the door is in the first position to allow for travel of the robotic accessor over the safety stop.

12. The safety stop mechanism of claim 11, wherein moving the door between the first position and a second position releases the plunger to allow for lateral travel, inducing movement of the stop from the down position to the up position to prevent travel of the robotic accessor beyond the safety stop.

13. The safety stop mechanism of claim 12, wherein the first position of the door is closed and the second position of the door is open.

14. The safety stop mechanism of claim 11, further including a bracket, pinned through the safety stop, to connect the safety stop to the end of the plunger.

15. The safety stop mechanism of claim 11, further including a cam track integrated into the safety stop, at least a portion of the pinned bracket traveling along the cam track as the safety stop is moved from the down position to the up position.

16. The safety stop mechanism of claim 11, further including a pin connecting at least a portion of the safety stop to the housing, wherein the safety stop is adapted for pivoting from the down position to the up position about the pin.

17. The safety stop mechanism of claim 11, further including a sensor device connected to the housing, wherein the sensor device is adapted for detecting the safety stop in at least one of the up position and the down position.

18. The safety stop mechanism of claim 11, wherein the housing is adapted for mounting to base structure of the automated storage library.

19. A method of manufacturing a safety stop mechanism for a robotic accessor in an automated storage library, comprising:
   providing a connector having first and second ends, the first end configured to contact a door of the automated storage library when the door is in at least a first position; and
   providing a safety stop connected to the second end of the connector and adapted to move from a down position to an up position, the safety stop in the down position when the door is in the first position to allow for travel of the robotic accessor over the safety stop.

20. The method of manufacture of claim 19, wherein the connector is adapted to travel laterally corresponding to movement of the door between the first position and a second position, consequently moving the safety stop from the down position to the up position, the up position preventing travel of the robotic accessor beyond the safety stop.

21. The method of manufacture of claim 19, further including providing a sensor device adapted to detect the safety stop in at least one of the up position and the down position.

* * * * *